Aug. 27, 1968  J. E. PICQUENDAR  3,398,537
SOLID-FUEL CONTROLLABLE-THRUST PROPULSION DEVICE
Filed May 31, 1966  2 Sheets-Sheet 1

Inventor

J. E. PICQUENDAR

By

Holcombe, Wetherill & Brisebois

Attorneys

Aug. 27, 1968     J. E. PICQUENDAR     3,398,537
SOLID-FUEL CONTROLLABLE-THRUST PROPULSION DEVICE
Filed May 31, 1966                          2 Sheets-Sheet 2

Inventor

J. E. PICQUENDAR

By
Holcombe, Wetherill & Brisebois
Attorneys

United States Patent Office
3,398,537
Patented Aug. 27, 1968

3,398,537
SOLID-FUEL CONTROLLABLE-THRUST PROPULSION DEVICE
Jean E. Picquendar, Saint-Remy-les-Chevreuses, France, assignor to Compagnie Francaise Thomson Houston-Hotchkiss Brandt, Paris, France
Filed May 31, 1966, Ser. No. 553,814
Claims priority, application France, June 9, 1965, 19,989
14 Claims. (Cl. 60—254)

ABSTRACT OF THE DISCLOSURE

The device comprises a casing (1–4) with a jet discharge orifice (5) and a tubular charge (6) of solid fuel in the casing. An electric resistance heater (7) is positioned adjacent the inner surface of the tubular charge and connected to an external circuit including source (8), switch (10) and potentiometer (9). The fuel charge has a composition such as to undergo a moderately exothermic chemical reaction on application of radiant heat thereto which reaction is not sustained in the absence of said applied heat. Thus operation of switch (10) will serve to initiate and arrest the generation of thrust from the device.

---

This invention relates to propulsion devices capable of developing a controllable thrust, of the kind used as auxiliary motors on space vehicles for such purposes as modifying the attitude of the vehicle, controlling the orbit of an artificial satellite, and similar manoeuvring and correcting functions.

Conventional devices of this kind have often used a stored pressure gas, such as nitrogen, to produce a controllable propulsion jet. Such devices are simple and convenient to control, but the need for carrying a heavy and bulky pressure vessel to store the gas is a serious inconvenience. Another type of controllable thrust propulsion device utilizes chemical fuels in the high-energy class similar to those used as rocket propellants, in conjunction with oxidants. The combustion of such fuels is very difficult to control, and their use in a controllable-thrust propulsion device requires elaborate valving and other mechanism for fractionizing the flow of fuel as well as complicated ignition means and cooling arrangements for adequately controlling the thrust developed by the device. Controllable-thrust devices have also been proposed wherein the thrust is produced by sublimation or vaporization of a charge of a suitable solid or liquid substance (including magnesium, mercury and various compounds), through the controlled application of heat to the charge. The heat is generally derived from the electric power generated by the solar batteries of the spacecraft, and is therefore limited. The thrust produced by a device of this type is determined by the saturating vapor pressure of the substance used, at the temperatures that can be applied. The developable thrust, therefore, is very limited and is inadequate for most applications other than in the case of the smaller and more lightweight satellites.

Objects of this invention include the provision of improved controllable-thrust propulsion devices or motors, for space vehicles which will combine the following advantageous features to a high degree:

Capability of developing relatively high thrusts, as well as high specific impulse, so as to be usable as auxiliary motors on board small or large space vehicles for economically exerting short or relatively long-term correcting and manoeuvering functions.

Compactness, light weight and simplicity, with no moving parts or only a few simple and sturdy movable mechanical components.

Efficient, convenient and dependable control of the developed thrust, with the possibility of initiating and arresting the thrust, in a virtually instantaneous manner.

Use of inexpensive and readily available fuels compounded in a novel way.

It is also an object, in an important aspect of the invention, to provide an improved controllable-thrust propulsion device so constructed that it can be operated intermittently at any desired intervals to generate a predetermined thrust impulse at each time. Related objects of the invention are to provide improved forms of solid fuel charge usable in controllable-thrust propulsion devices or auxiliary motors for space vehicles.

A controllable-thrust propulsion motor according to the invention has a charge of solid fuel placed in a sealed casing provided with an outlet for the discharge of a gaseous jet, and is characterized primarily in that the solid fuel charge has a composition so predetermined that it will undergo a controllable chemical reaction of exothermic character in the presence of heat, the products of the reaction then producing said gaseous jet for discharge through said outlet, and in that there is associated with the casing a source of heat, and control means for controlling the application of heat from the source to the fuel charge in order to control the progress of said reaction and hence control the thrust developed by the device.

The solid fuel charge may have a composition such that it requires the application of heat both to initiate the exothermic reaction, and to sustain such reaction, whereby the propulsion thrust can very easily be turned on and off by simply turning on and off the application of heat to the charge. For such purpose, the fuel charge may contain, as its active ingredient or ingredients, one or more substances capable of undergoing a dissociation reaction, or any other reaction such as oxidation, which is moderately exothermic, the exothermicity being insufficient to sustain the reaction in the absence of the application of external heat, but yet being sufficient to generate high-temperature, high-pressure gaseous reaction products capable of providing a high-velocity propulsion jet.

The fuel charge may, in another aspect, contain as its active ingredient or ingredients one or more substances selected from within the class of high-energy fuels usable as conventional rocket propellants, but compounded with inert constituents in such a way as to render the reaction controllable through the application of heat to the fuel charge.

The heat source is conveniently an electric heater powered from any suitable source of electric energy, such as a solar battery. The heat source may also assume other forms, such as direct sunlight, in which case a movable shutter can be used as the control means for initiating and arresting the reaction.

The objects and features of the invention will appear from the ensuing disclosure of some illustrative embodiments thereof, with reference to the accompanying drawings, wherein.

Figure 1:
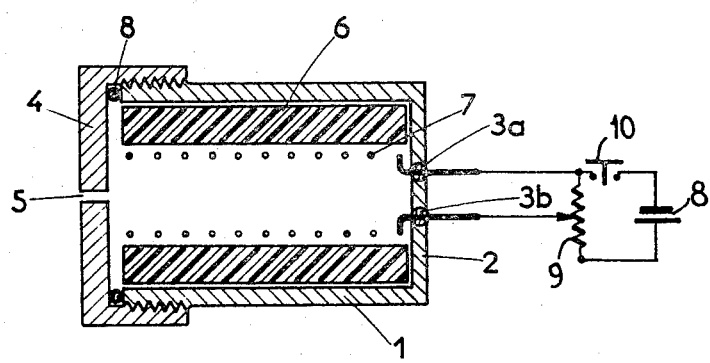
FIG. 1 is a simplified view in axial cross section of a controllable-thrust propulsion device or motor according to one embodiment of the invention, also showing a circuit diagram of the electric power supply used.

In the embodiment shown in FIG. 1, a controllable-thrust jet motor according to the invention includes a generally cylindrical casing 1 made of any suitable strong and heat resistant material, such as stainless steel. Casing 1 has an end wall 2 and its opposite end is open and has a flanged cap 4 sealed thereover by means of a threaded connection with the casing as shown, with an annular seal 8 being interposed to make the connection pressure-tight. The cap 4 is formed with a central outlet 5 for the discharge of the gases generated within the casing in operation as presently described.

Positioned within the tubular casing 1 is an annular charge cake 6 of solid fuel, e.g. methyl methacrylate base composition as later described herein. The fuel charge is in the form of a tubular element having an outer diameter closely corresponding to the inner diameter of casing 1. Supported coaxially and inwardly of the inner surface of the tubular fuel element is an electric heating element in the form of a resistance coil 7. The extremities of the heating coil 7 are led out of the casing by way of sealed outlets 3a and 3b in the end wall 2, for connection to any suitable electric circuit schematically shown as including a source of direct current 8, for instance a solar battery of which the device forms part, and a potentiometer device 9 in parallel across the source, and an on-off switch 10. Instead of the D-C source shown, an A-C power source may be used according to the invention.

The fuel charge 6 may comprise any of various chemical compounds, and mixtures of compounds, which are capable of undergoing a controllable exothermic reaction. By "controllable exothermic reaction" is here meant any chemical reaction that is so mildly exothermic that it requires the input of heat to initiate and to be sustained, but which, while sustained, generates sufficient heat to ensure that the gaseous reaction products are at a substantial temperature level, so that their high-velocity discharge through the jet nozzle orifice 5 will create thrust. With a fuel charge 6 capable of undergoing a reaction of the character just indicated, it will be understood that energization of the heating resistor 7 as by closure of the switch 10, will initiate the reaction and the resulting discharge of reaction products from nozzle 5 will produce thrust, while on deenergization of the resistor by opening switch 10, the reaction will cease and no thrust will be available. Further, adjustment of the potentiometer 9 may serve to regulate the thrust produced. A controllable-thrust motor is thus provided.

Among the many classes of reagents capable of use as the ingredients in the fuel charge of a controllable-thrust motor according to the invention, synthetic resins have been found particularly useful and are preferred. The principal controllable exothermic reactions in which the resins are involved in the operation of the invention may include simple depolymerization or decomposition, and oxidation with an oxidizer provided in admixture therewith in the fuel charge. However, other classes of reagent and types of reaction may be used provided the condition as to the controllability of the exothermic reaction is fulfilled.

The following are some examples of fuel ingredients usable according to the invention and the controllable exothermic reactions that they undergo in operation.

*Example 1*

Methyl methacrylate polymer

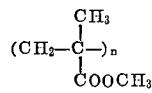

can be used as the single active ingredient in a fuel charge composition according to the invention. When heated to a temperature of about 250° C., the polymer depolymerizes and the monomer is evolved in a gaseous form, and is discharged from nozzle 5, generating thrust. The exothermic depolymerization reaction is found to be highly controllable, in that it can be initiated and arrested in a virtually instantaneous manner by turning on and off the electric power applied to resistor 7. With 15 watts power in the heating resistor, the generated thrust is about 1 gramme (force), with a specific impulse of about 100 seconds.

*Example 2*

Isobutyl methacrylate polymer

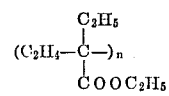

has given comparable results.

*Example 3*

A mixture of polyvinyl chloride and an oxidizer such as ammonium perchlorate can be used to provide the controllable exothermic reaction in a fuel charge according to the invention. The ratio of the perchlorate to the polymer should be in the range from about 1:2 to about 1:4 by weight, with 1:3 being a preferred proportion. When the above range of proportions is present in the mixture, the chemical reactions in the fuel charge are believed to proceed in the main as follows. The perchlorate, when heated, breaks down according to the reaction.

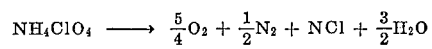

The released oxygen oxidizes the polyvinyl chloride by the reaction

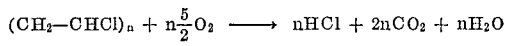

This last reaction generates heat which serves to decompose the excess polyvinyl chloride. The electric energy applied to the heater coil serves primarily to heat the fuel mixture, with a minor fraction of the energy serving to sustain the reaction. The power applied to the heater can readily be determined by test to provide the desired thrust and response time, in view of the dimensioning of the fuel charge.

*Example 4*

A mixture of polybutadiene and an oxidizer such as ammonium nitrate can be used to provide a chain of reactions broadly similar to that described in Example 3, with comparable results. In this case the ratio of nitrate to polybutadiene should be in the range from about 2:1 to about 7:1 by weight, e.g. 4:1.

In a fuel charge according to the invention using any of the above compounds or sets of compounds as the chief ingredients, there may be added a small amount of a doping compound. The proportion of such a doping compound should in every case be held low enough to ensure that the over-all reaction remains controllable in the sense indicated earlier herein.

The fuel charge according to the invention may further include any of the usual ingredients included in conventional solid rocket fuels and which do not participate in the chemical reaction. Such ingredients may comprise binders, plasticizers, stabilizers, opacifiers, and the like.

Figure 2:
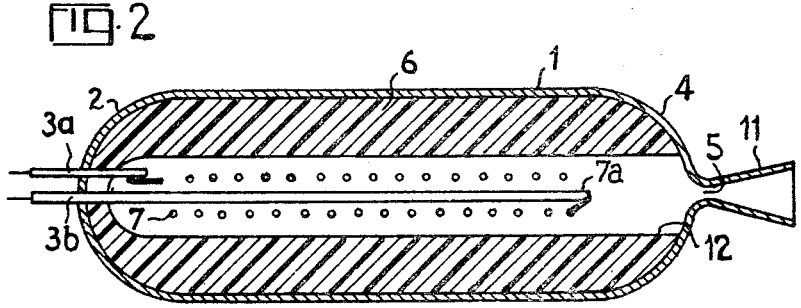
FIG. 2 is an axial cross sectional view of a propulsion device generally similar to the one shown in FIG. 1, but in a modified construction.

In the embodiment of the invention shown in FIG. 2, wherein parts corresponding to parts in FIG. 1 are designated by the same numerals, the casing 1 of the controllable-thrust motor is in the form of a generally cylindrical shell with integrally domed end walls 2 and 4. The end wall 2 has the current leads 3a and 3b extending through it, while the end wall 4 has a central outlet orifice 5 therein, around which a diverging nozzle element 11 projects. The shell assembly described may be integrally press formed from relatively thin-gauge steel sheet, or any other strong, heat resistant and preferably lightweight material, e.g. resin-glass or other laminate, preferably suitably reinforced.

Molded within the shell 1 is the solid fuel charge 6 which may comprise any of the compositions mentioned above as capable of producing a controllable exothermic reaction. The fuel charge 6 is shown as being in the form of a generally tubular molded mass having its outer surface conforming to and tightly adherent to the inner surface of the shell 1 and its end walls 2 and 4, and having a cylindrical recess 12 extending axially into the mass from the rear end wall 4 to a point spaced a small distance from the other end wall 2. The recess 12 defines at its rear end a clear exit for the gaseous reaction products through the orifice 5 and jet nozzle 11.

The insulated lead 3b is extended axially into the recess 12 as an insulating rod 7a around which is supported the resistive heating coil 7 having its respective ends connected to the free end of a connecting wire extending through the insulating rod 7d, and to the insulated lead 3a. Leads 3a and 3b are connected to an external power circuit as described with reference to FIG. 1, not here shown.

A motor constructed in accordance with this embodiment with a methyl methacrylate fuel charge weighing about 10 grammes, was operated with 40 watts developed in the heating coil, producing a temperature of about 300° C. The fuel was found to decompose at a rate of 20 grammes per hour, at a substantially constant velocity. Practically no solid residue was produced. The gaseous reaction products generated a thrust of about 0.5 gramme (force). This value is suitable for orbit-adjusting purposes in the case of a light artificial satellite of about 30 kg. total weight. When the electric power was cut off from resistor 7 prior to complete decomposition of the charge, the thrust was practically instantaneously arrested, and when power was reapplied the thrust was immediately resumed. Inspection of the fuel charge after increasing amounts of it had been consumed by such repeated de-energizations and energizations showed that the decomposition of the fuel proceeded highly uniformly over the wall surface of the recess 12. After complete decomposition of the charge, there only remained an extremely thin layer of carbonaceous deposit over the inner wall surfaces of the shell 1.

Figure 3:
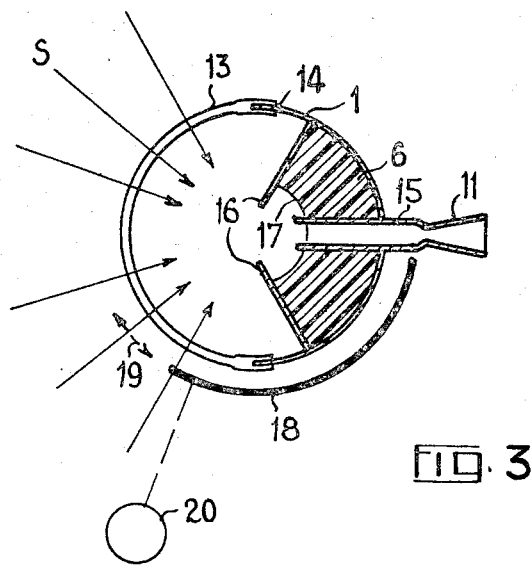
FIG. 3 is a similar view of another embodiment of the invention in which the source of heat is direct sunlight instead of the electric heater resistance used in the embodiments of FIGS. 1 and 2.

In a controllable-thrust jet motor according to the invention, the energy for controlling the reaction is not necessarily provided by way of an electrically heated coil as in FIGS. 1 and 2, but other sources of energy may be used provided they have means associated therewith for switching the power on and off. One convenient power source on satellites and spacecraft is direct solar radiation, as distinct from the solar battery referred to in the embodiments of FIGS. 1 and 2. FIG. 3 illustrates schematically an embodiment of the invention using direct sun power.

The controllable-thrust device in FIG. 3 includes a shell 1, made of any suitable strong, heat-resistant, lightweight and opaque material, e.g. sheet steel, reinforced resin laminate or the like. The shell 1 may be in the form of a hemisphere or a semi-cylinder and is connected with a complementary shell member 13 in the form of a hemisphere or semicylindrical casing. The shell member 13 is transparent to solar radiation, being made of any suitable strong transparent sheet material such as suitable glass, Plexiglas, Lucite or the like. The transparent member is joined to the opaque shell member 1 by means of suitable pressure resistant joints as shown at 14. A tubular nozzle 15 extends radially through the center of the opaque shell wall 1 and terminates at its outer end in a divergent jet nozzle 11, the inner end of tube 15 being shown extending short of the center of the circular contour of the casing. A fuel chamber is defined within the casing around the inner part of the tubular nozzle 15, said chamber being outwardly limited by a pair of generally radial wall segments 16, made of opaque material projecting inwardly from arcuately spaced points of the opaque shell wall member 1. Within this fuel chamber is placed a molded mass of fuel 6, which may have any of the compositions earlier indicated herein so as to undergo a controllable exothermic chemical reaction on and during the application of heat energy thereto, e.g. a methyl methacrylate base molded composition. The outer surface of the fuel charge 6 adheres to the inner surface of shell member 1 and radial partitions 16, whereas the inner free surface of said charge is preferably recessed as shown at 17.

An opaque arcuate mask or shutter member 18 is movably mounted around the casing for circumferential displacement about the center of the generally circular casing, as indicated by arrows 19; the movable mounting means for shutter 18 may assume any suitable mechanical form and has not been shown.

Means schematically indicated at 20, and which may include a manual or electromagnetic control are mechanically connected to the shutter 18 for displacing it between an open position, as shown in the drawing, and a closed position overlying the wall member 13. In the open position illustrated, shutter 18 uncovers the transparent wall and will allow the solar radiation to concentrate in the central region thereof and in the recess 17 of the fuel charge. The heat thus supplied to the fuel charge will trigger and sustain the reaction and the gaseous reaction products will issue through tube 15 and nozzle 11 to generate thrust. When the arcuate shutter 18 is moved through control 20 to its other position (not shown) overlying the transparent wall section 13, the input of solar radiations is cut off and the reaction is arrested, so that the thrust is cut off. Shutter 18 may, if desired, be movable to intermediate positions for thrust regulation.

Figure 4:
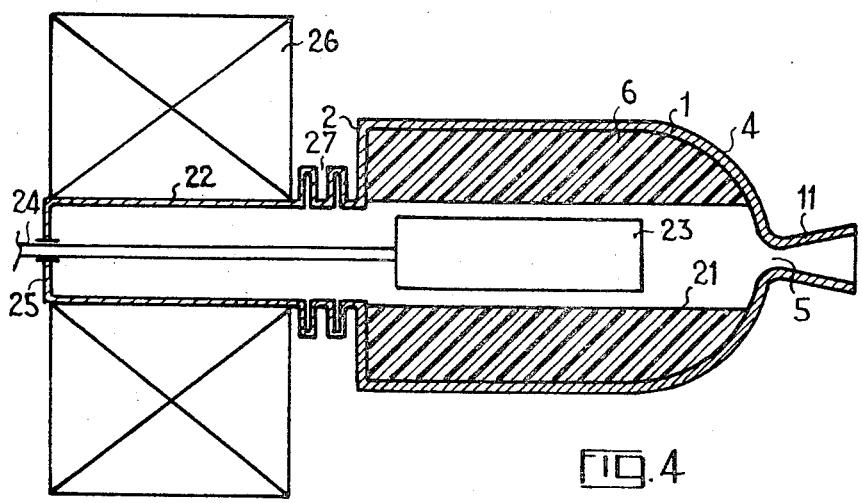
FIG. 4 is a similar view of a further embodiment, in which the source of heat is a radioactive source movably associated with the fuel charge.

In the further embodiment shown in FIG. 4, radiant energy from a radioactive source is used as the power source for triggering and sustaining the controllable exothermic reaction. The fuel casing 1 which may be made of the materials earlier indicated is in the form of a generally tubular shell having a flat front end wall 2 and a domed rear end wall 4 centrally apertured at 5 to communicate with the rearwardly diverging jet nozzle 11. A generally tubular fuel charge 6, e.g. a methyl methacrylate base compound or any of the other compositions indicated above, is molded in the shell so as to have an outer surface adherent to the inner shell surface and an inner surface in the form of a straight through cylindrical bore 21. The flat end wall 2 of the casing is formed with a central opening corresponding in diameter to that of bore 21, and the casing is extended by a tubular extension section 22 projecting forwardly from wall 2. A cylindrical slug 23 is mounted on an actuating rod 24 projecting axially into the fuel casing shell 1 through an aperture formed in the front end wall 25 of extension casing 22, and provided with a suitable sliding seal. The slug 23 contains a small amount of a radioactive compound or isotope.

With rod 24 pushed inwardly, through a manual or other actuating control, not shown, connected to it, so that the radioactive slug 23 is positioned in the recess 21 of fuel element 6, the heat of the radiation permanently emitted from the isotope in the slug triggers the reaction in the fuel and thrust appears at the outlet nozzle 11 as earlier explained. The reaction and consequent thrust are sustained so long as slug 23 is left in the position shown. If rod 24 is pulled forward so that slug 23 is moved out of recess 21 and into the extension casing 22, the reaction is almost immediately arrested and thrust is cut off. Thrust adjustment can be achieved by moving radioactive slug 23 to intermediate positions.

The extension casing 22 is shown closely surrounded by an element 26 which may be any device capable of utilizing the heat energy radiated from the radioactive source during those periods when slug 23 is in its forward position, i.e. the controllable-thrust motor is inoperant. Device 26 may, for example, be a conventional thermoelectric cell capable of deriving electric power from the radioactive heat source. Means such as the labyrinth joint 27 are preferably interposed between the fuel casing and the extension casing 22 to reduce to a low value the heat conduction through the wall of said extension.

Various embodiments of the invention others than those specifically shown and described may be readily conceived by those familiar with the art from the teachings provided by the present disclosure. Such modifications may involve the means used for controllably supplying energy to trigger and sustain, or alternatively cut off, the controllable exothermic reaction and hence the thrust produced by the motor. The use of electric power, preferably through a heating coil as shown in FIGS. 1 and 2, is at the present time preferred, especially because it provides a close correlation between the amount of thrust desired and the amount of electric power supplied, and therefore facilitates the design, adjustment and control of the controllable thrust motor.

Other modifications of the invention may involve the fuel composition used. As earlier indicated a wide variety of reagents capable of undergoing a controllable exothermic reaction, as this phrase is herein defined, may be used for the purposes of the invention. For any reagent or set of reagents used, the optimal composition will depend on various factors such as the size and geometry of the fuel charge and the mass and degree of thermal isolation of the fuel casing and other parts of the controllable thrust motor. Thus, a large fuel charge and a fuel casing well isolated thermally from its surroundings, may require the fuel composition to be so predetermined that the exothermic reaction will generate less heat than in the case of a smaller charge and a casing that admits of a higher rate of heat dissipation towards the exterior in order to ensure the requisite controllability of the thrust.

For these reasons, it is difficult to indicate precise fuel compositions suitable for use in the invention. However, the precise fuel compositions can be readily determined by experiment for each motor design, especially in cases where the active fuel ingredients are selected among those indicated earlier herein. One particularly simple method of acting upon the fuel composition in order to ensure that the reaction will be controllable by the external energy input in accordance with this invention, is to alter the relative proportion of the active ingredient or ingredients in the fuel charge to the inert constituents therein, including the binder, stabilizer and the like. In fact, conventional high-energy solid fuels of the kind heretofore used as rocket propellants may have their composition modified by increasing the relative proportion of inert to active constituents therein, in order to make them serve as fuels in the controllable-thrust motors of this invention. For example, in a typical solid rocket fuel composition comprising, by weight, about 94.5% combined nitrocellulose and nitroglycerine, about 3.25% diethylphthalate plasticizer, with the remainder consisting of stabilizer, opacifier, lubricant and other additions, the relative proportion of the combined nitro-ingredients may be reduced to a suitable value for use in a controllable-thrust motor according to the invention.

What is claimed is:
1. A controllable-thrust propulsion device for spacecraft and the like, of the type using exclusively solid propellant ingredients, comprising:
   a sealed casing having an outlet orifice for the discharge of a gaseous reaction jet;
   a charge of solid fuel in the casing;
   said fuel charge having a composition so predeterminated as to undergo a controllable chemical reaction of mildly exothermic character on application of heat energy to said charge which reaction will be arrested on cessation of said application of heat energy;
   a source of radiant heat associated with said casing; and control means operable to control the application of said radiant heat energy from said source to a surface of the fuel charge whereby the operation of said control means to initiate and terminate the application of radiant heat to said surface will actuate and arrest the progress of said reaction and the thrust developed by said device.

2. A controllable-thrust device as defined in claim 1, wherein said heat source comprises an electric heating element and a source of electric power, and said control means comprises means connected in circuit with said power source and heating element to control the the energization of said element.

3. A controllable-thrust device as defined in claim 1, wherein said fuel charge is tubular, said heat source comprises electrical heating means disposed internally of said tubular charge, and said control means comprises circuit means for selectively energizing said electric heating means.

4. A controllable-thrust device as defined in claim 1, wherein said heat source comprises sunlight.

5. A controllable-thrust device as defined in claim 1, wherein said casing includes a radiation-transparent wall section, arranged to be exposed in use to a source of thermal radiation for concentration of said fuel charge, and said control means comprises movable shutter means opaque to said radiations and means for selectively moving the shutter means between positions in which said transparent wall section is respectively exposed to and shut off from said radiation.

6. A controllable-thrust device as defined in claim 5, wherein said source of thermal radiation is sunlight.

7. A controllable-thrust device as defined in claim 1, wherein said heat source comprises radioactive material, and the control means is operable to place the radioactive source in and out of radiation-transferring relation with the fuel charge.

8. A controllable-thrust device as defined in claim 7, wherein said fuel charge is recessed, said radioactive source is displaceably mounted for movement into and out of the recess in the fuel charge, said control means is operable to move the radioactive source into and out of the recess, and there is provided an auxiliary utilization device positioned to be exposed to radiation from said radioactive source when the source is moved out of said recess in the fuel charge.

9. A controllable-thrust device as defined in claim 1, wherein the fuel charge contains a thermally decomposable synthetic resin as an active ingredient therein.

10. A controllable-thrust device as defined in claim 1, wherein said fuel charge comprises a methacrylate base resin as an active ingredient therein.

11. A controllable-thrust device as defined in claim 1, wherein the fuel charge contains a thermally decomposable and oxidizable polymer and an oxidizer as active ingredients therein.

12. A controllable-thrust device as defined in claim 1, wherein the fuel charge contains a high-energy rocket propellant fuel as active ingredient therein in conjunction with neutral constituent in a proportion such as to render the reaction of said active ingredient controllable.

13. A controllable-thrust propulsion device using exclusively solid propellant ingredients, comprising:
   a sealed casing having an outlet orifice for the discharge of a gaseous reaction jet;
   a tubular charge of solid fuel in the casing;
   a source of heat; and
   means operable to control the application of heat from said source to the internal surface of said tubular charge;
   wherein said fuel charge has a composition so predetermined as to undergo a controllable chemical reaction on application of heat to said internal surface of the charge, said reaction generating gaseous reaction products for discharge through said tubular charge and out of said outlet orifice, which reaction will not be sustained except during the application of said heat;

whereby the operation of said control means to initiate and terminate said application of heat will actuate and arrest, respectively, the generation of thrust from said device.

14. The device defined in claim 13, wherein said source of heat comprises an electric resistance heater means adjacent said inner surface of the tubular charge and said control means comprises a selectively energizable power supply circuit connected to said resistance heater means.

References Cited

UNITED STATES PATENTS

| | | | |
|---|---|---|---|
| 2,976,678 | 3/1961 | Kennedy | 60—256 |
| 3,097,480 | 7/1963 | Sohn | 60—203 |
| 3,129,562 | 4/1964 | Kuehl et al. | 60—234 |
| 3,136,119 | 6/1964 | Avery | 60—251 X |
| 3,203,170 | 8/1965 | D'Alelio | 60—219 |
| 3,310,946 | 3/1967 | Dobbins | 60—219 |
| 3,315,471 | 4/1967 | Dailey et al. | 60—203 |

CARLTON R. CROYLE, *Primary Examiner.*